United States Patent [19]

Sherer

[11] Patent Number: 5,935,245
[45] Date of Patent: Aug. 10, 1999

[54] METHOD AND APPARATUS FOR PROVIDING SECURE NETWORK COMMUNICATIONS

[75] Inventor: William P. Sherer, Sunnyvale, Calif.

[73] Assignee: 3Com Corporation, Santa Clara, Calif.

[21] Appl. No.: 08/827,965

[22] Filed: Apr. 29, 1997

Related U.S. Application Data

[60] Provisional application No. 60/032,842, Dec. 13, 1996.

[51] Int. Cl.$^6$ ............................. G06F 7/00; H04L 29/06
[52] U.S. Cl. ........................ 713/200; 713/201; 709/200
[58] Field of Search .............................. 395/186, 187.01, 395/188.01; 370/401, 392, 389; 340/825.07; 380/49

[56] References Cited

U.S. PATENT DOCUMENTS

| 5,594,869 | 1/1997 | Hawe et al. | 395/187.07 |
| 5,752,003 | 5/1998 | Hart | 395/500 |
| 5,796,942 | 8/1998 | Esbensen | 395/187.01 |

FOREIGN PATENT DOCUMENTS

| 0 658 837 | 6/1995 | European Pat. Off. . |
| 0 668 680 | 8/1995 | European Pat. Off. . |
| WO 89 08887 | 9/1989 | WIPO . |

OTHER PUBLICATIONS

Bellovin, S.M., et al., "Network Firewalls," IEEE Communications Magazine, vol. 32, No. 8, Sep. 1, 1994, pp. 50–57.

*Primary Examiner*—Ly V. Hua
*Attorney, Agent, or Firm*—Townsend and Townsend and Crew LLP

[57] ABSTRACT

A data pattern enforcer provides secure network communications at an adaptor layer by comparing transmitted and received packets to a set of rules to verify that said packets are appropriately being transmitted or received. The data pattern enforcer prevents application or other software with access to an adaptor on a network from using the adaptor for packet sniffing or spoofing. In a specific embodiment, the data pattern enforcer verifies packets at the layer 2 adaptor level using a value bit vector (which may be alterable or may be preset to a value, including to zero), a count value, and a mask to compare to data found in packets.

24 Claims, 4 Drawing Sheets

METHOD AND APPARATUS FOR PROVIDING SECURE NETWORK COMMUNICATIONS

This application claims priority from provisional patent application Ser. No. 60/032,842, filed Dec. 13, 1996, which discussed a number of background concepts related to the invention.

BACKGROUND OF THE INVENTION

This invention relates to transmission of information between multiple digital devices on a network and between multiple networks on an internetwork. More particularly, this invention relates to a method and apparatus for providing secure network communications on a per-packet level in a network system.

Related technology is discussed in co-assigned copending U.S. patent applications Ser. Nos. 08/502,835, and 08/542, 157, entitled METHOD AND APPARATUS FOR TRANSPARENT INTERMEDIATE SYSTEM BASED FILTERING ON A LAN OF MULTICAST PACKETS, filed Oct. 12, 1995.

Networking Devices Standards

This specification presumes some familiarity with the general concepts, protocols, and devices currently used in LAN networking applications and in WAN internetworking applications such as protocols used for networking within a LAN, for example, the IEEE 802 protocol suite available from the IEEE (Institute for Electrical and Electronics Engineers). These IEEE 802 protocols have been revised and reissued by the International Organization For Standardization (ISO) with the designation ISO 8802. Among the protocols specified in IEEE 802 are the LAN protocols (IEE 802.3) commonly referred to as Ethernet. A separate set of protocols used in internetworking, i.e., connecting multiple LANs, may be referred to as the TCP/IP Protocol Suite. (TCP and IP are acronyms for Transmission Control Protocol and Internet Protocol.) The TCP/IP Suite is promulgated in a series of documents released by the Internet Engineering Task Force. These standards are publicly available and discussed in more detail in the above-referenced patent applications and will not be fully discussed here.

FIG. 1

FIG. 1 illustrates a local area network (LAN) 40 of a type that might be used today in a moderate-sized office or academic environment and as an example for discussion purposes of one type of network in which the present invention may be effectively employed. LANs are arrangements of various hardware and software elements that operate together to allow a number of digital devices to exchange data within the LAN and also may include internet connections to external wide area networks (WANs) such as WANs 82 and 84. Typical modern LANs such as 40 are comprised of one to many LAN intermediate systems (ISs) such as ISs 60–62 that are responsible for data transmission throughout the LAN and a number of end systems (ESs) such as ESs 50a–d, 51a–c, and 52a–g, that represent the end-user equipment. The ESs may be familiar end-user data processing equipment such as personal computers, workstations, and printers and additionally may be digital devices such as digital telephones or real-time video displays. Different types of ESs can operate together on the same LAN. In one type of LAN, LAN ISs 60–61 are referred to as bridges and WAN ISs 64 and 66 are referred to as routers, however many different LAN configurations are possible, and the invention is not limited in application to the network shown in FIG. 1.

The LAN shown in FIG. 1 has segments 70a–e, 71a–e, and 72a–e, and 73a. A segment is generally a single interconnected medium, such as a length of contiguous wire, optical fiber, or coaxial cable or a particular frequency band. A segment may connect just two devices, such as segment 70a, or a segment such as 72d may connect a number of devices using a carrier sense multiple access/collision detect (CSMA/CD) protocol or other multiple access protocol such as a token bus or token ring. A signal transmitted on a single segment, such as 72d, is simultaneously heard by all of the ESs and ISs connected to that segment.

Packets

In a LAN such as 40, data is generally transmitted between ESs as independent packets, with each packet containing a header having at least a destination address specifying an ultimate destination and generally also having a source address and other transmission information such as transmission priority. ESs generally listen continuously to the destination addresses of all packets that are transmitted on their segments, but only fully receive a packet when its destination address matches the ES's address and when the ES is interested in receiving the information contained in that packet. An ES such as 52g may transmit data to any other device on the LAN by transmitting a data packet containing a destination address for the intended destination. If the intended destination is directly connected to the same segment, such as ES 52d, then ES 52d hears and receives the packet as it is being transmitted by 52g. If, however, the destination ES is not directly connected to the same segment as the source ES, then LAN 40 is responsible for transmitting the data to a segment to which the destination ES is connected. Generally, a source ES is not aware of whether a destination ES in its LAN is directly connected to its segment. The source simply transmits the packet with a destination address and assumes that eventually the destination will hear the packet. Transmissions within the LAN are generally source driven, i.e., the LAN will deliver a data packet from a source to the destination address specified in the packet regardless of whether that destination ES actually wants to receive the packet. In general, packets contain user data that the user of an ES wishes to receive, such as portions of a data file or video or audio data stream which will be reassembled at the ES after all packets that make that file are received, or portions of a video stream which will be displayed to the user. In some prior art systems, the data packet may contain information that the ES formerly wished to receive, but no longer wishes to receive, such as packets for a video conference that the ES is no longer connected to. Packets may also be control packets, containing control information that is used to facilitate communication within the network.

Drivers, Adaptors, and LAN Topology

Each of the ISs and ESs in FIG. 1 includes one or more adaptors and a set of drivers. An adaptor generally includes circuitry and connectors for communication over a segment and translates data from the digital form used by the computer circuitry in the IS or ES into a form that may be transmitted over the segment, e.g., electrical signals, optical signals, radio waves, etc. An ES such as 50b will have one adaptor for connecting to its single segment. A LAN IS such as 61 will have five adaptors, one for each segment to which it is connected. A driver is a set of instructions resident on a device that allows the device to accomplish various tasks as defined by different network protocols. Drivers are generally software programs stored on the ISs or ESs in a manner that allows the drivers to be modified without modifying the IS or ES hardware.

LANs may vary in the topology of the interconnections among devices. In the context of a communication network, the term "topology" refers to the way in which the stations attached to the network are interconnected. Common topologies for LANs are bus, tree, ring, and star. LANs may also have a hybrid topology made up of a mixture of these. The overall LAN pictured in FIG. 1 has essentially a tree topology, but incorporates one segment, 72d, having a bus topology. A ring topology is not shown in FIG. 1, but it will be understood that the present invention may be used in conjunction with LANs having a ring topology.

Other Network Devices

The LAN ISs in LAN 40 include bridges 60–63. Bridges are understood in the art to be a type of computer optimized for very fast data communication between two or more segments. A bridge according to the prior art generally makes no changes to the packets it receives on one segment before transmitting them on another segment. Bridges are not necessary for operation of a LAN and, in fact, in prior art systems are generally invisible to the ESs to which they are connected and sometimes to other bridges and routers. Even at the most simple level, a bridge such as 60 tends to isolate network traffic on segments and reduces the chance of collision between packets. Modern bridges also provide filtering functions whereby a bridge learns the LAN addresses of all ESs that may be reached through each of its ports and forwards packets only out of the port to which the destination ES of that packet is connected.

FIG. 2 depicts a packet as it may be transmitted to or from router 64 on LAN segment 73a. The packet is essentially an Ethernet packet, having an Ethernet header 202 and a 48-bit Ethernet address (such as 00:85:8C:13:AA) 204, and an Ethernet trailer 230. Within the Ethernet packet 200 is contained, or encapsulated, an IP packet, represented by IP header 212, containing a 32 bit IP address 214 (such as 199.22.120.33). Packet 200 contains a data payload 220 which holds the data the user is interested in receiving or holds a control message used for configuring the network.

Layers

An additional background concept important to understanding network communications is the concept of layered network protocols. Modern communication standards, such as the TCP/IP Suite and the IEEE 802 standards, organize the tasks necessary for data communication into layers. At different layers, data is viewed and organized differently, different protocols are followed, and different physical devices handle the data traffic. FIG. 3 illustrates one example of a layered network standard having a number of layers, which we will refer to herein as the Physical Layer, the Data Link Layer, the Routing Layer, the Transport Layer and the Application Layer. These layers correspond roughly to the layers as defined within the TCP/IP Suite. (The 802 standard has a different organizational structure for the layers and uses somewhat different names.) At the Physical Layer, data is treated as an unformatted bit stream transmitted from one transmitter to one or more receivers over a single segment. ES and IS hardware generally interact with the physical layer through adaptors that accept binary data from the IS or ES and translate that data into signals transmittable on the medium. The adaptors include the circuitry and connections necessary for communication over the medium. Adaptors for PCs are commonly available as standard bus cards which plug into a PC parallel bus and have a connector for connecting to the medium on which network signals are transmitted.

At the Data Link Layer (DLL) (sometimes referred to as Layer 2 or the MAC layer), data is treated as a series of independent packets, each packet containing its own destination address and fields specifying packet length, priority, and codes for error checking.

At the Routing Layer (sometimes referred to as Layer 3), data is treated as a series of independent routing packets. A routing packet contains information necessary for correct delivery of the packet over a large WAN such as the internet. This information is used at the Routing Layer to transfer the packet through the network to its destination.

At the transport layer, data is seen as a connection between two hosts on the network. Transport layer protocol in TCP/IP includes TCP and UDP.

The Application layer includes programs that a user interacts with to use network functions, such as e-mail, ftp, remote login, or http. Data at the application layer is often viewed as files.

An important ideal in layered standards is the ideal of layer independence. A layered protocol suite specifies standard interfaces between layers such that, in theory, a device and protocol operating at one layer can coexist with any number of different protocols operating at higher or lower layers, so long as the standard interfaces between layers are followed.

Inherent Insecurity of packet communication

A problem that has increasingly arisen the LAN and WAN network environments is that in most prior art networks packet traffic on the line is fundamentally insecure. In a LAN segment such as 72d, for example, every ES on that LAN segment will hear every packet sent to any ES on that segment. In general, each ES in the network has a unique Ethernet (or MAC) address, and an ES will listen to any packet on the transmission channel and discard any packets it hears that are not addressed to its MAC address.

However, ESs are not forced by the network to discard packets not addressed to them. In general, adaptors placed into ESs such as 52g-d can be configured to operate in promiscuous mode during power-up or when debugging the network. In promiscuous mode, the adaptor reads every packet it hears on the network and passes that packet up the protocol stack to higher layer software running in the ES. During configuring or debugging, these packets are examined to the extent necessary to perform the legitimate task required.

However, promiscuous mode operation also can be used by an ES to read and examine all the network traffic on the network without authorization, even traffic not addressed to that ES. This activity is sometimes known in the art as sniffing. In most existing LAN environments and with most existing hardware, sniffing can be accomplished by a user running software on an ES such as 52f that can reset the ESs Ethernet receive addresses or put the adaptor in promiscuous mode. This software is sometimes referred to in the art as cracking software. Using this software, versions of which are now widely available, an employee or other legitimate user of a LAN, can gain unauthorized access to other data on the LAN, using the existing hardware and network connections. In a worst case, this sniffing will be completely undetectable to the person whose traffic is being spied on or to network management.

A related security problem can occur during transmissions from a LAN whereby software running on the LAN can send the outgoing packet addresses to mimic another ES's packets. This technique is known in the art as spoofing. An unscrupulous user spoofing another's packets can introduce unwanted data, such as viruses, into a packet stream being transmitted from the ES, or can hijack a user's network session and gain unauthorized access to other system resources.

There are, however, some times when an ES or other network device will want to legitimately send out a packet with a different MAC address. As one example, on Ethernet there is a concept known as transparent bridging in which an ES acts as a transparent forwarder of packets for some other ES. In some prior art systems, an adaptor can take the source address from a register and insert it into a packet in order to force the MAC address. Older token ring cards also may forcibly insert a source address.

A number of techniques have been proposed or implemented to thwart sniffing and spoofing. These techniques largely rely on verification of either the MAC address or the IP address of the packet. These techniques are limited, however, because there is no guarantee that packets being transmitted on the network have a valid MAC or IP address in their packet header. Some of these techniques are based on a lookup table (LUT) implementation, where MAC addresses and IP addresses are compared to data stored in a LUT. LUT implementations based on the IP address of a packet are limited because even when an IP address is valid, the MAC address may not be and may indicate a spoofed address. LUT implementations have also proven very expensive to implement in terms of the additional hardware that must be incorporated into each adaptor card. Another disadvantage of an a LUT verification strategy is that each adaptor's LUT would have to be updated each time a new MAC address was added to the network.

While some of these techniques can be effective in certain networking environments, all of them have certain important limitations, including cost. What is needed is a simple, inexpensive, technique for insuring packet security in a LAN system, a technique that does not require ES adaptors to be modified each time a new ES is added to the network.

For purposes of clarity, the present discussion refers to network devices and concepts in terms of specific examples. However, the method and apparatus of the present invention may operate with a wide variety of types of network devices including networks dramatically different from the specific examples illustrated in FIG. 1 and described below. It is therefore not intended that the invention be limited except as done so in the attached claims.

SUMMARY OF THE INVENTION

The invention is an improved method and apparatus for transmitting data in a LAN. According to the present invention, adaptor cards or drivers for installation in a network include a simple data pattern enforcer (DPE) operating at the lowest layer at which packets are recognized. The DPE may be comprised of hardware or software elements and have associated with it a mechanism for applying a rule or a set of rules to packets either transmitted or received at the lowest layer at which the packets exist. These mechanisms may include a set of one or more pattern-matching masks and a count indication into the packet as to where pattern-matching will begin. The invention will be further understood upon reference to the drawings and description of specific embodiments below.

DETAILED DESCRIPTION OF PREFERRED EMBODIMENTS

General method of the invention

Figure 1:
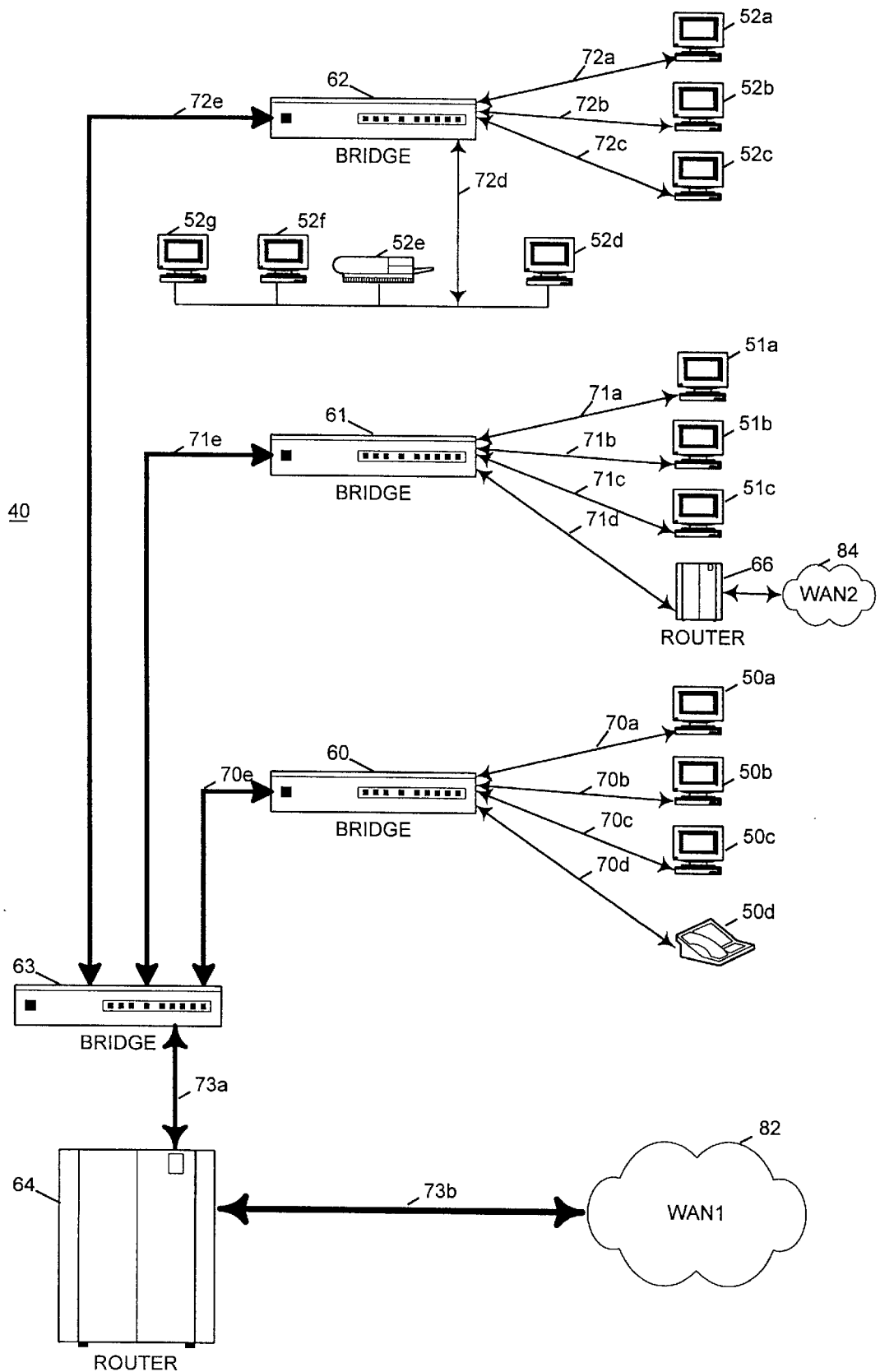
FIG. 1 is a diagram of one type of local area network in which the invention may be effectively employed.
Figure 2:
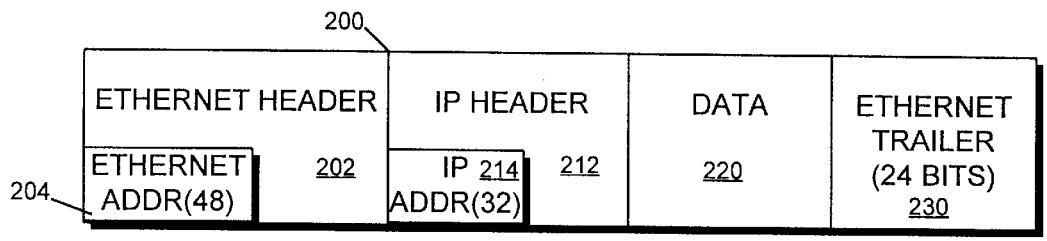
FIG. 2 is a diagram of an IP packet encapsulated in an Ethernet packet.
Figure 3:
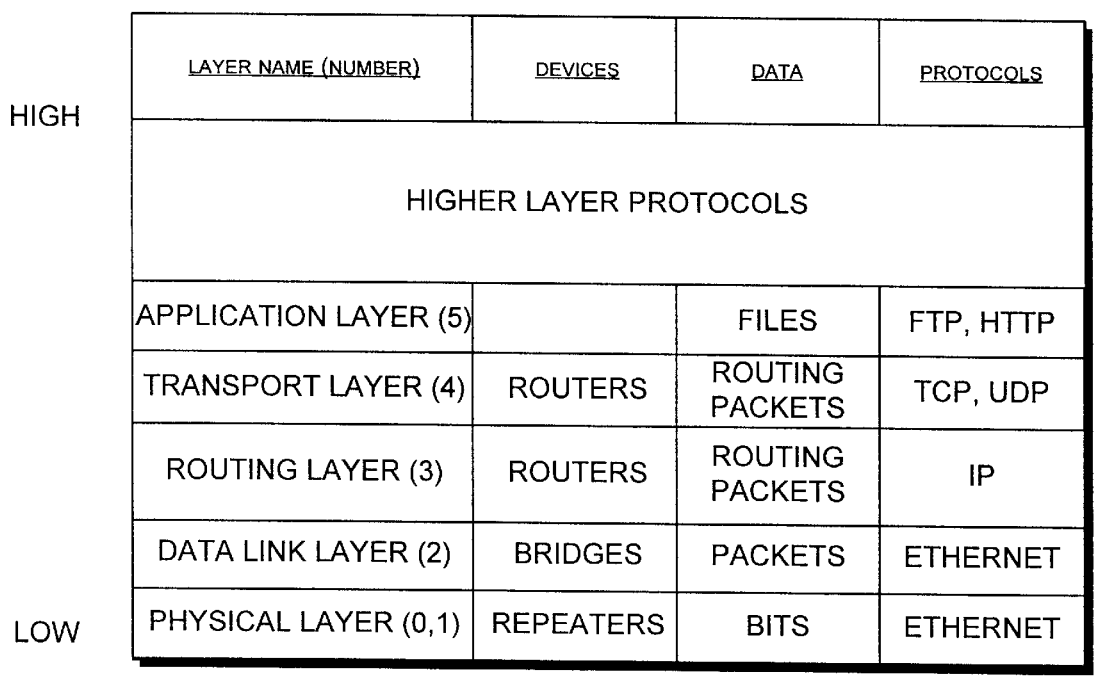
FIG. 3 is a diagram showing a layered network protocol.
Figure 4:
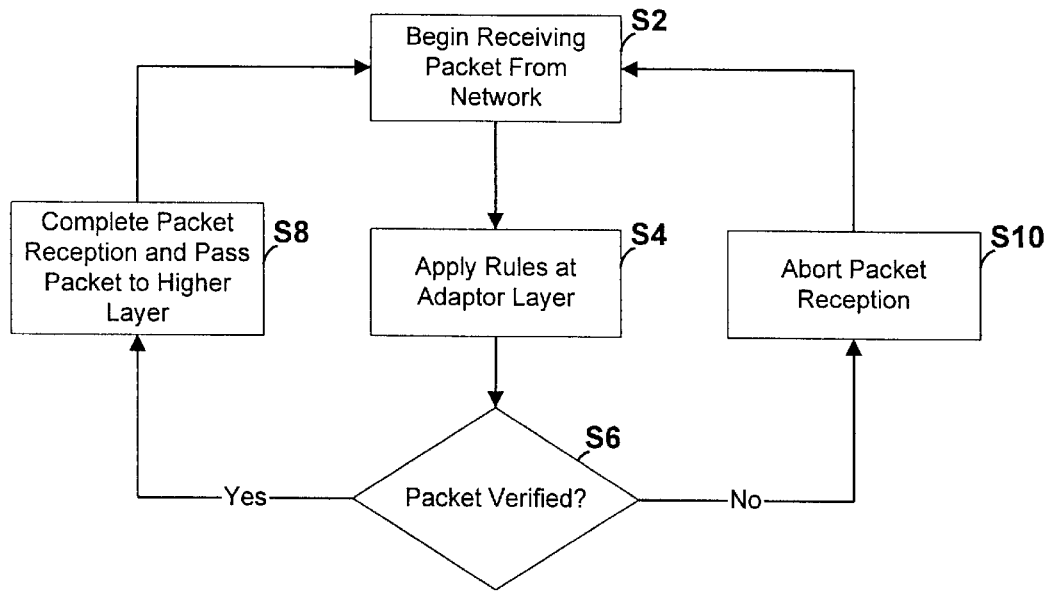
FIG. 4 is a flowchart of the method of the invention on packet transmission.

FIG. 4 is a flowchart illustrating the operation of a DPE during packet reception, according to one embodiment of the invention. The invention operates as each data packet is received from a transmission channel (Step S2).

A specific embodiment of the invention using a simplified rule set will be described. Up to three values are used by the DPE: a Count, a Value Bit Vector (VBV), and a Don't Care Bit Vector (DCBV). The count is a value indicating a position in a network data packet. For example, the count may represent a number of bytes into a network packet. In some embodiments, the count may effectively be absent, in which case a preset count, such as a count of zero indicating a rule starting at the beginning of the packet, would be assumed. The VBV is a bit string that is compared to the bits in the packet at the position indicated by the count. The DCBV, if present, is a mask indicating whether or not certain bit locations within the VBV are values that are not used by the matching. If a DCBV is used, for every bit in the VBV there is a Don't Care Bit (DCB) indicating whether that bit is used or ignored in the compare.

On reception, the packet is read at least until enough data is received to allow for selection and application of the appropriate rules for the packet (in one embodiment, essentially until the position indicated by the count is reached) (S2). The packet contents are then checked against the rules (S4), which may include a comparison to the value stored in a VBV ignoring those bits indicated in the DCBV if one is present. This comparison may indicate whether the packet contents are equal or not equal to the VBV or whether the contents have some other relation to the VBV such as being greater than or less than the VBV. If, according to the appropriate rule, a packet is verified (S6), the packet reception is allowed to complete and the packet is passed to higher layer processes (S8). If the packet is not verified, the packet is discarded without passing the packet data up to any higher layer protocol (S10). When an unverified packet is received, a report may optionally be generated to either a higher layer protocol or to a security server on the network.

Figure 5:
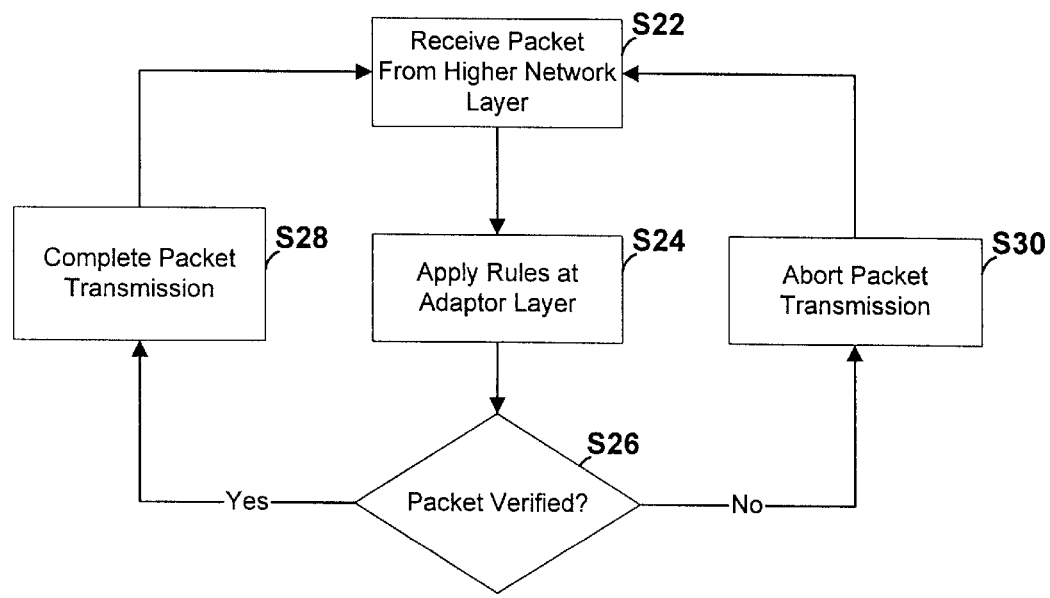
FIG. 5 is a flowchart of the method of the invention on packet reception.

FIG. 5 is a flowchart illustrating the operation of a DPE during packet transmission, according to one embodiment of the invention. The invention operates as each data packet is received from a higher layer protocol to be transmitted over a transmission channel (Step S22). The packet contents are then checked against the rules (S24). If, according to the appropriate rule, a packet is verified (S26), the packet transmission is allowed to complete normally and the packet is sent out over the transmission channel (S28). If an unverified packet is detected, packet transmission is halted (S30) and the remainder of the packet transmission may be filled with null characters. Optionally, a bad checksum may be appended to the packet so that the packet will be rejected as corrupted by any other adaptor hearing the packet. In an alternative embodiment, if the VBV patterns don't match at packet transmit, the adaptor may force the bit patterns in the packet to match the desired VBV, and then compute the CRC (checksum) over the new packet. If the count is set within an address, this alternative embodiment may prevent spoofing. When a mismatch is detected, a report may optionally be generated and sent out to a security node over the network.

The following is an example of the operation of an embodiment of the invention. For purposes of this example, we will assume a single VBV of one byte (8 bits) long, with the VBV, a DCBV, and a count as indicated:

VBV=01101110
DCBV=10000001
Count=4

In this example, on reception, when a packet is received off the network, the byte indicated by the count is examined. The DPE expects the data to be of the format x110111x, where x indicates don't-care bit positions (either 0 or 1) and the other values match what is in the VBV register. The examined byte may be a byte in the packet header, either part of the MAC address, the IPX address, or the IP address. However, it will be seen that the invention allows verification to happen at any place in the packet as determined by the count value. This results in a further advantage of the invention in that the method of the invention allows verification to take place on data indicating any protocol layer merely by setting the count value to point into the header of the protocol layer desired. The invention also may allow for verification at many different protocol layers at once by having multiple rules with multiple count values pointing to data in different layer headers. In essence, the invention provides a data link layer protection for packets coming in at any layer.

Hardware Implementation

Figure 6:
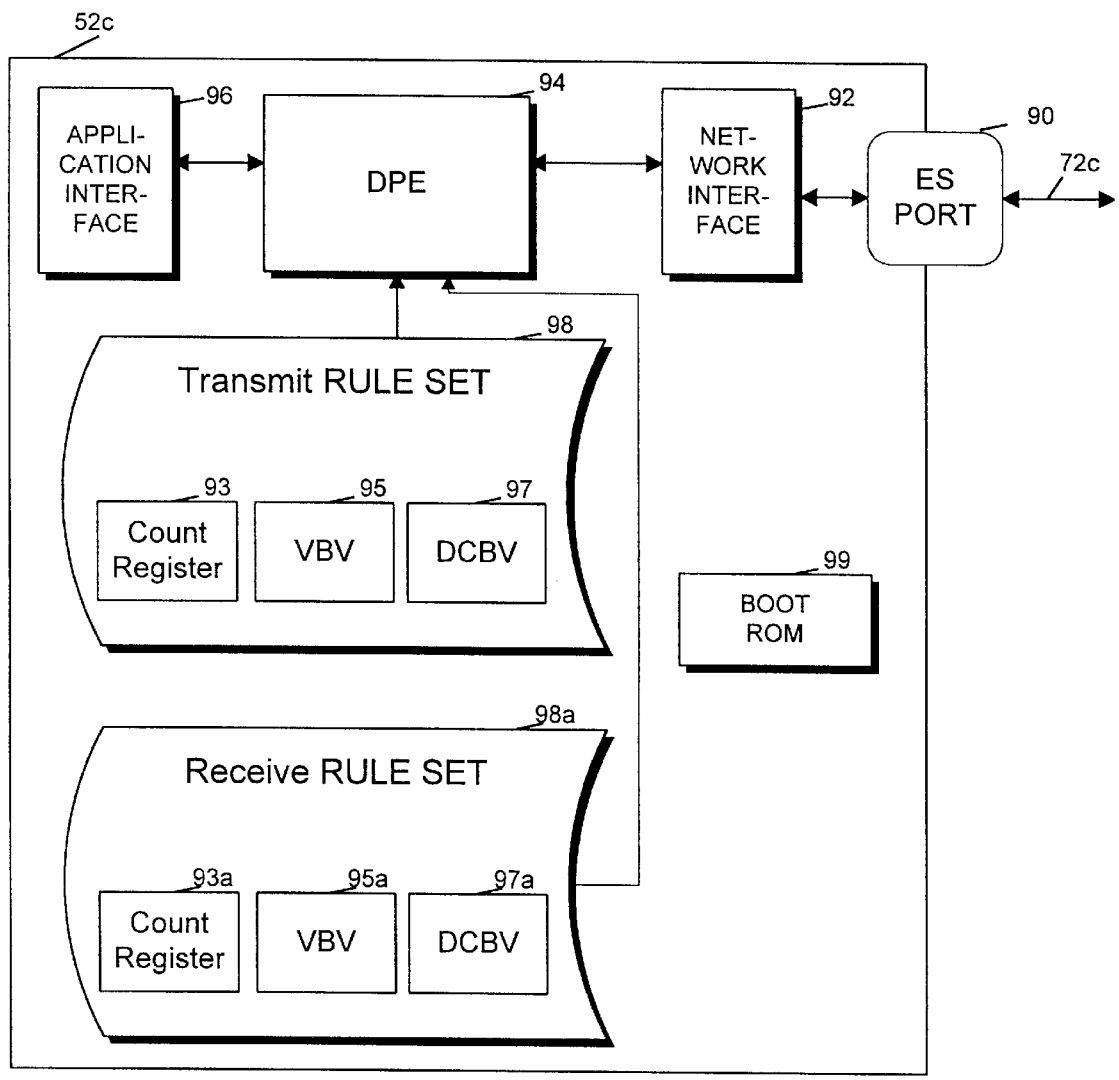
FIG. 6 is a block circuit diagram of an adaptor including a security mechanism according to the invention.

A hardware implementation of the invention included in an adaptor is shown in FIG. 6. Packets are sent and received from the network by interface 92 and are examined by DPE 94. DPE 94 reads rules from rule set 98, which may include registers 93, 95, 97 to hold the values for the count, VBV, and DCBV respectively. These rule sets may also include other rules to be applied to the packets at the adaptor layer. In one implementation, these registers will be set during adaptor manufacture and be unalterable. In a preferred implementation, the registers will be such that their values may be read from boot ROM 99 during boot and are thereafter "locked-down" and invisible to any higher layer protocol. This insures that there is no other software running on the system that might attempt to hijack network communications, because at boot time the boot ROM has control. In order to implement this aspect of the invention, the adaptor hardware provides a means for the adaptor to know that it is in a trusted mode of operation (such as the boot phase), versus a normal operating mode in which hijacking software could be active. In general, the ROM 99 is a nonvolatile but configurable memory, such as an EEPROM, which cannot generally be changed while in a user's ES, but which can be removed from the ES hardware and reprogrammed as is known in the art. The count may or may not be programmable in the EEPROM or other non-volatile memory and there may or may not be a DCBV. In a preferred embodiment, an adaptor constructed according to the invention will also not allow any software to place the adaptor into promiscuous mode except during a boot.

One application of the current invention would be in a multimedia Ethernet environment where, for example, a number of different MAC addresses will be received at the same computer, each with some shared field and some variable fields indicating different priorities in the MAC addresses. In such an environment, use of the DPE with a DCBV can verify on just those portions of the packet headers that can be expected to remain the same.

The invention also has the ability to employ different rules for different kinds of traffic. In this case, DPE 94 will examine data in the packet to determine which rule class should be employed and then will perform packet verification as described above.

The hardware mechanism described for applying the rule may determine equality between the values taken from the packet header and values in a packet validation register or it could encompass any number of logical rules other than a simple equality, such as relative comparison wherein a packet is validated if a particular field is greater than some number (e.g. a number stored in the VBV) and less than some other number (e.g. a number stored in a second VBV), or some other logical or mathematical function that can be performed by the adapter. Therefore, it will be apparent to those of skill in the art that one aspect of the invention is use of a rule that can be implemented on the adapter at layer 2 for validating packets on transmission or reception, and this rule or group of rules can encompass any rule which may be performed by the adapter at that layer. It will be understood that a rule generally will be selected so that it can be applied quickly so as to not negatively affect adaptor performance.

One advantage of the present invention is that it may be implemented piecemeal in a LAN such as 40 without requiring that every adaptor in the LAN include the DPE. In one embodiment, the present invention may be implemented by modifying only some of the adaptors in a LAN, while not requiring that ESs be updated simultaneously.

The invention has now been explained with reference to specific embodiments. Other embodiments will be apparent to those of skill in the art. In particular, method steps have been grouped and labelled as being part of various sub-methods in order to increase clarity of the disclosure; however, these steps could be differently grouped without changing the essential operation of the invention. It is therefore not intended that this invention be limited, except as indicated by the appended claims.

What is claimed is:

1. A method for preventing completed reception of an unauthorized packet by a network adaptor comprising:

beginning to receive a packet from a communication channel;

using a count value and a value bit vector (VBV) to compare data in said packet at said count value to said value bit vector;

completing reception of said packet if said compare indicates that data in said packet matches said value bit vector; and aborting reception of said packet without passing said packet to higher layer software if said compare indicates that data in said packet does not match said value bit vector.

2. The method according to claim 1 further comprising:

using a don't care bit vector (DCBV) to indicate that certain bits in said VBV should not be compared to bits in said packet.

3. The method according to claim 2 wherein said count value is a non-alterable value and may be implicit in said compare function.

4. The method according to claim 1 wherein said compare takes place at a data link layer protocol and said packets are never passed up to a higher layer protocol if said compare fails.

5. The method according to claim 4 wherein said count value indicates data in a layer 3 address of said packet.

6. The method according to claim 3 wherein said data comprise a security field included in said packet.

7. The method according to claim 1 wherein said count value indicates data in a packet header.

8. The method according to claim 7 wherein said count value indicates data in a layer 2 address of said packet.

9. The method according to claim 1 wherein said count value is a non-alterable value and may be implicit in said compare function.

10. A method for preventing completed transmission of an unauthorized packet by an adaptor card comprising:
- receiving a packet to transmit from a higher layer protocol:
- beginning to transmit a packet on a communication channel;
- using a count value and a value bit vector (VBV) to compare data in said packet at said count value to said value bit vector;
- if said compare indicates that data in said packet matches said value bit vector, completing transmission of said packet; and
- if said compare indicates that data in said packet does not match said value bit vector, aborting transmission of said packet.

11. The method according to claim 10 further comprising:
- using a don't care bit vector (DCBV) to indicate that certain bits in said VBV should not be compared to bits in said packet.

12. The method according to claim 10 wherein said compare takes place at a data link layer.

13. The method according to claim 10 wherein said count value indicates data in a packet header.

14. The method according to claim 13 wherein said count value indicates data in a layer 2 address of said packet.

15. The method according to claim 13 wherein said data comprises a layer 3 address of said packet.

16. The method according to claim 13 wherein said data comprises a security field included in said packet.

17. A method for preventing completed reception of an unauthorized packet by a network adaptor comprising:
- beginning to receive a packet from a communication channel;
- applying a rule to said packet at a packet reception layer;
- completing reception of said packet if said rule indicates that said packet is valid; and
- aborting reception of said packet without passing said packet to higher layer software if said rule indicates that said packet is not valid.

18. A method for preventing completed transmission of an unauthorized packet by an adaptor card comprising:
- receiving a packet to transmit from a higher layer protocol;
- applying a rule to said packet at a packet transmission layer;
- completing transmission of said packet if said rule indicates that said packet is valid; and
- aborting transmission of said packet if said rule indicates that said packet is not valid.

19. An adaptor driver for use in an end system comprising:
- an application interface for passing packets between a network and higher network layers;
- a set of adaptor layer packet verification rules;
- a data pattern enforcer for applying said rules to packets at the adaptor layer; and
- a network interface for communicating packets on a network.

20. A method for preventing completed reception of an unauthorized packet by a network adaptor comprising:
- beginning to receive a packet from a communication channel;
- using a count value and a value bit vector to apply a simple validation rule to packet values in said packet at said count value;
- completing reception of said packet if said simple validation rule indicates that data in said packet is valid; and
- aborting reception of said packet without passing said packet to higher layer protocols if said simple validation rule indicates that data in said packet is not valid.

21. The method according to claim 20 wherein said simple validation rule takes place at a data link layer protocol and said packets are never passed up to a higher layer protocol if said rule fails.

22. The method according to claim 20 wherein said count value indicates packet values in a packet header.

23. The method according to claim 20 wherein said packet values comprise a security field included in said packet.

24. The method according to claim 20 wherein said count value is a preset, non-alterable value and may be implicit in said simple validation rules.

* * * * *